US009961384B2

(12) United States Patent
Fischer

(10) Patent No.: US 9,961,384 B2
(45) Date of Patent: May 1, 2018

(54) METHOD AND A SECURITY MODULE CONFIGURED TO ENFORCE PROCESSING OF MANAGEMENT MESSAGES

(71) Applicant: NAGRAVISION S.A., Cheseaux-sur-Lausanne (CH)

(72) Inventor: Jean-Bernard Fischer, Rochejean (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 139 days.

(21) Appl. No.: 14/107,716

(22) Filed: Dec. 16, 2013

(65) Prior Publication Data

US 2014/0177835 A1    Jun. 26, 2014

Related U.S. Application Data

(60) Provisional application No. 61/739,739, filed on Dec. 20, 2012.

(51) Int. Cl.
*H04N 21/258* (2011.01)
*H04N 21/266* (2011.01)
(Continued)

(52) U.S. Cl.
CPC . *H04N 21/25816* (2013.01); *H04N 21/26606* (2013.01); *H04N 21/26613* (2013.01);
(Continued)

(58) Field of Classification Search
CPC ............. H04N 7/167; H04N 21/25816; H04N 21/26606; H04N 21/4627; H04N 21/4181; H04N 21/4623; H04N 21/26613
(Continued)

(56) References Cited

U.S. PATENT DOCUMENTS 5,029,207 A * 7/1991 Gammie .............. H04N 7/1675
348/E7.056
5,461,675 A 10/1995 Diehl et al.
(Continued)

FOREIGN PATENT DOCUMENTS

WO    WO 01/22684    3/2001
WO    WO 2012/110306    8/2012

OTHER PUBLICATIONS

European Search Report issued in EP 12 19 8402 dated Apr. 23, 2013.

*Primary Examiner* — Matthew T Henning
(74) *Attorney, Agent, or Firm* — DLA Piper LLP (US)

(57) ABSTRACT

A method and a security module configured to enforce processing of management messages. The security module is associated to a multimedia receiver configured to receive broadcast access controlled multimedia services. The management messages are transmitted by a managing center to the multimedia receiver. The method comprises steps of: receiving by the security module at least one global management message addressed to a plurality of multimedia receivers operated by the managing center, tracing processing of said global management message, receiving at least one positive addressing management message addressed to said security module, checking, by the security module, anterior processing of the global management message through the value of the parameters set during tracing processing of the global message, processing the positive addressing management message only if previous checking gives a result indicating a successful enforcement of the global management message allowing the multimedia receiver accessing the broadcast multimedia services.

12 Claims, 2 Drawing Sheets

(51) Int. Cl.
*H04N 21/418* (2011.01)
*H04N 21/4623* (2011.01)
*H04N 21/4627* (2011.01)

(52) U.S. Cl.
CPC ..... *H04N 21/4181* (2013.01); *H04N 21/4623* (2013.01); *H04N 21/4627* (2013.01)

(58) Field of Classification Search
USPC ........................................................ 380/210
See application file for complete search history.

(56) References Cited

U.S. PATENT DOCUMENTS

| | | | |
|---|---|---|---|
| 5,937,067 A * | 8/1999 | Thatcher | H04N 7/1675 348/E7.056 |
| 6,393,562 B1 | 5/2002 | Maillard | |
| 8,526,614 B2 | 9/2013 | Moreillon et al. | |
| 8,578,505 B2 * | 11/2013 | Dagaeff | H04H 60/14 380/210 |
| 9,148,746 B2 * | 9/2015 | Raouf | H04W 4/005 |
| 2003/0147531 A1 * | 8/2003 | Sasselli | H04N 7/163 380/210 |
| 2004/0101138 A1 | 5/2004 | Revital et al. | |
| 2007/0061875 A1 * | 3/2007 | Le Buhan | H04N 7/165 726/10 |
| 2008/0059993 A1 | 3/2008 | Jia et al. | |
| 2010/0119060 A1 * | 5/2010 | Nishida | H04N 7/1675 380/43 |
| 2010/0310068 A1 * | 12/2010 | Fischer | H04N 7/1675 380/43 |
| 2011/0188655 A1 | 8/2011 | Moreillon et al. | |
| 2013/0326553 A1 | 12/2013 | Nicolas | |

* cited by examiner

METHOD AND A SECURITY MODULE CONFIGURED TO ENFORCE PROCESSING OF MANAGEMENT MESSAGES

CROSS-REFERENCE TO RELATED APPLICATIONS

This application claim the benefit of U.S. Provisional Application No. 61/739,739, filed Dec. 20, 2012, which is incorporated by reference in its entirety.

FIELD

The invention relates to a method and a security module configured to enforce processing of management messages, the security module being associated to a multimedia receiver.

TECHNICAL BACKGROUND

In the known standard pay-TV broadcast model, as disclosed in the "EBU Functional Model of a Conditional Access System", EBU technical review, winter 1995, the pay-TV service to be broadcast is encrypted and the keys to decrypt the pay-TV service on the multimedia receiver side are placed in Entitlement Control Messages (ECM) sent together with the scrambled pay-TV service. The ECM messages are encrypted with a transmission key, which is changed frequently for security reasons.

In addition to the descrambling keys, the ECM messages carries information on the pay-TV service conditional access rights in the form of access conditions to be enforced on the multimedia receiver side.

Subscriber conditional access rights (for example a service subscription right for one month), as well as the transmission keys, are managed and transmitted on an asynchronous way in the form of Entitlement Management Messages (EMM). The EMM messages are encrypted with secret keys only known by the multimedia receiver.

For a multimedia receiver to be able to receive and decrypt a service, the first step is therefore to receive and decrypt the EMM messages carrying the rights corresponding to the product as well as the EMM messages carrying the transmission keys necessary to decrypt the ECM messages. For that purpose, the multimedia receiver comprises a unique key and the EMM is encrypted by this unique key and broadcast so that only this multimedia receiver can decrypt the EMM message. For that purpose, symmetric or asymmetric keys can be used.

The multimedia receiver is associated or locally connected to a security module comprising at least one processor and a memory. The security module can have different forms, such as a smartcard, a secure chip, an USB dongle or tamper-resistant software stored in a secure memory of the multimedia receiver.

The security module is considered as secure enough to store in its memory at least the transmission key, the unique key pertaining to the multimedia receiver and access right (or rights) to one or more pay-TV services.

The roles of the security module are to receive the ECM and EMM messages, decrypt the ECM message using the transmission key and extract the access key (or keys) as well as the access conditions related to a selected pay-TV service. The security module checks if the right matching the access conditions contained in the ECM message is present in the memory of the security module and in a positive case, the access key is returned to the multimedia receiver for decrypting the selected service.

An ECM message can contain more that one access condition definition, in this case, according to a policy applied, the security module can check the presence of the rights in its memory and return the access key if at least one of the rights is present. According to another policy, the security module can return the access key only if all the rights matching the whole set of access conditions are present in the memory of the security module.

Document US2004/0101138A1 discloses a system and a method for secure distribution of digital media content through a packet-based network such as the Internet. The security of the method does not require one-to-one key exchange, but rather enables keys, and/or information required in order to build the key, to be broadcast through the packet-based network. The digital media content is then also preferably broadcast, but cannot be accessed without the proper key. However, preferably only authorized end-user devices are able to access the digital media content, by receiving and/or being able to access the proper key. Thus, the system or method is useful for other types of networks in which digital media content is more easily broadcast rather than unicast, in addition to packet-based networks. ECM is broadcast to all end user devices, but the particular end user device is more preferably only able to generate the key if this end user device also receives an EMM from broadcaster head end. The EMM is optionally and more preferably used for periodic renewal of security module, such that without periodic receipt of such an EMM, security module eventually is no longer able to access the media content, because it is no longer able to use the ECM information to generate the key for decrypting the media content. The EMM may be sent to a plurality of different end user devices at one time, as a broadcast or multicast, such that a group of end user devices would receive the information at once. For example, a particular EMM could be designated for one group of end user devices, according to a particular subscription plan or other type of payment structure, and/or according to the network address of the members of the group of end user devices. A preferred feature of EMMs is an authorization period, such that EMMs are preferably only valid for the authorization period, after which a new EMM must be received. Thus, the security information is still renewed, while also supporting access of authorized end users to the media content, even in a non-reliable network environment such as the Internet.

Document US2008/0059993A1 discloses subscriber authorization system including: an authorization management system, configured to transmit, through multicasting, an authorization message EMM to a plurality of terminals on a transmission network, wherein the EMM carries a multicast address, a product identity and authorization data. Before transmitting the EMM to authorize the subscribers, a multicast address of a group is determined. Because every card has a unique card address, a number of cards with a common address attribute are set in the group. During the authorization process concerning a product, the authorization management system encapsulates authorization data, a product identity and the multicast address into an EMM and transmits the EMM to terminal devices of subscribers through group-based multicast. A terminal device of a subscriber belonging to the group identified by the EMM parses the authorization message upon receiving the EMM, obtains information of whether the subscriber has subscribed to the product and performs authorization on the subscriber according to the information of whether the subscriber has subscribed to the product.

According to these methods, the EMM messages are sent for updating rights in the security module. Only ECM processing is conditioned by the processing of an EMM as usual in known user devices.

Document EP1212879B1 discloses a process and a transmission system of chain of database updating messages between a managing centre and a plurality of subscriber databases geographically shared. Each message includes a chain identifier and a chain index allowing the identification of the message in the chain. If a message is not received following interference in the connection, the processing of further messages can cause the locking of databases. In order to avoid this drawback, the solution consists in adding to each message a condition block which determines if this message has to be processed without reference to elements of the chain or which are the conditions linked to the previous processing of elements of the chain.

The particularity of each message is that it contains only a part of the data intended to the database; two cases are possible:
the order of message reception plays an important role and each message has to follow the preceding one.
the order of reception do not play any role and the messages are executed at reception.

In this document all messages of the chain are sent according to a same mode: either broadcast, multicast or upon request from the subscriber unit.

At present, when reception of a global EMM message by all security modules has to be enforced for security reasons, a ECM-related key is changed if the processing of the EMM message has given a result such as a data segment change in the security module memory or a new version of a piece of software. Global key change may be a risky operation and is problematic whenever multimedia receivers are disconnected. In this case, the reception of a new key by the security module can take a long time, so that the user may call the managing center and trigger an immediate update, which is an expensive operation.

SUMMARY

The drawbacks of the known methods of verifying correct reception and execution of management messages by a security module are overcome by avoiding risky key changes while simplifying, still in a secure way, global updates of multimedia receiver's security module.

The aims are achieved by a method to enforce processing of management messages by a security module associated to a multimedia receiver configured to receive broadcast access controlled multimedia services, the management messages received from a managing center by the multimedia receiver being processed by the security module, the method comprising steps of:
receiving by the security module of the multimedia receiver at least one global management message addressed to a plurality of multimedia receivers operated by the managing center,
tracing the processing of said global management message by setting parameters in a memory of the security module,
receiving by the security module of the multimedia receiver at least one positive addressing management message addressed to said security module,
checking, by the security module, anterior processing of the global management message through the value of the parameters set during tracing the processing of the global message,
processing the positive addressing management message only if previous checking gives a result indicating a successful processing of the global management message allowing the multimedia receiver accessing the broadcast multimedia services.

A further embodiment is a security module configured to enforce processing of management messages, the security module being associated to a multimedia receiver configured to receive broadcast access controlled multimedia services and the management messages from a managing center, wherein:
the security module is further configured to
receive at least one global management message addressed to a plurality of multimedia receivers operated by the managing center;
trace the processing of said global management message by setting parameters in a memory of the security module;
receive at least one positive addressing management message specifically addressed to said security module;
check anterior processing of the global management message through the value of the parameters set during tracing the processing of the global message, and
process the positive addressing management message only if previous checking gives a result indicating a successful processing of the global management message allowing the multimedia receiver accessing the broadcast multimedia services.

The processing of positive addressing (PA) management messages, also called specific management messages is conditioned by the processing of the global management messages addressed to all receivers.

So until the global management message has been processed, the positive addressing operations are blocked by the security module. When the period of validity of the rights normally renewed by the PA expires, the security module will stop granting access to the corresponding services, as per the usual PA mechanism.

As soon as the global management message has been processed, the next PA management message will be processed normally and access to the services will be renewed.

A positive addressing message comprises at least an identifier of the security module to which the message is addressed. In practical cases, in order to transmit to several security modules the same message, it contains a plurality of security module identifiers structured in a table so that each identifier is associated to commands and parameters for setting up access rights in the concerned security module. At reception of the positive addressing message by the security module, the identifiers included in the message are compared with the identifier of the concerned security module and when a match is found, the related commands are executed as for example an extension of a service expiry date. According to the method of the invention, the expiry date is thus extended only if the processing of global messages (addressed to all multimedia receivers) has let a trace such as an activated flag or a particular state in a register or a memory of the security module.

The positive addressing is performed in function of the security modules and not in function of the parameters and/or rights contained in the security module whatever their values are. In an example of configuration, the global EMMs are sent every 10 minutes while the positive addressing EMMs are sent every week.

BRIEF DESCRIPTION OF THE FIGURES

The invention will be better understood with the following detailed description, which refers to the attached figures given as non-limiting examples.

DETAILED DESCRIPTION

The methods and devices described below use standard mechanisms present in most of the security modules in a new way. Particular embodiments apply to pay TV and aim to render the processing and execution of positive addressing management messages PA-EMMs dependent on the anterior processing of other management messages. The processing of the positive addressing management messages PA-EMMs or specific management messages depends on conditions set by global management messages G-EMMs that shall be enforced.

The term "enforce" means to impose processing of given G-EMMs to set up access conditions or rights in a security module according to a purchased subscription, i.e. PA-EMMs have no effect as long as the G-EMMs are not executed.

According to an example, the positive addressing PA mechanism gives to the security module SM a predetermined period of authorized working capability; this authorization is renewed regularly to ensure an honest paying subscriber is receiving his purchased services. Normally, when a subscriber buys a service, an EMM is sent to his security module to grant the rights. When the subscriber unsubscribes from a service, a cancellation EMM is sent to remove the rights. If a dishonest subscriber buys long term subscriptions and, after reception of management messages EMMs granting access to services, blocks all further EMMs and cancels his subscriptions, the subscriber (i.e., his receiver) will never get the cancellation EMMs and would have access to the services forever.

With the positive addressing management messages mechanism, the rights are granted only for a limited period and a PA-EMM is sent regularly to renew the rights, so that if all EMMs are blocked, the rights will expire after this period and the security module SM will stop processing entitlement control messages ECM carrying control words necessary to descramble the services.

According to a preferred embodiment, at least one positive addressing management messages PA-EMM is broadcast at the end of a sequence of global EMMs G-EMM which have to be first processed before processing the PA-EMM. The managing center MC prepares a sequence comprising one or more global EMMs G-EMMs followed by one or more PA-EMMs which will be recognized under condition that the global EMMs have been processed. The PA-EMMs may be addressed to one particular multimedia receiver MR but in general they are preferably addressed to a predefined group of multimedia receivers. The sequence may also comprise in addition to the global EMMs, a plurality of PA-EMMs addressed to a group of multimedia receivers as well as to individual receivers. A group of multimedia receivers MR may be defined by a location code, a portion of a network address or a portion of an identifier of the security module or the receiver itself, etc.

Figure 1:
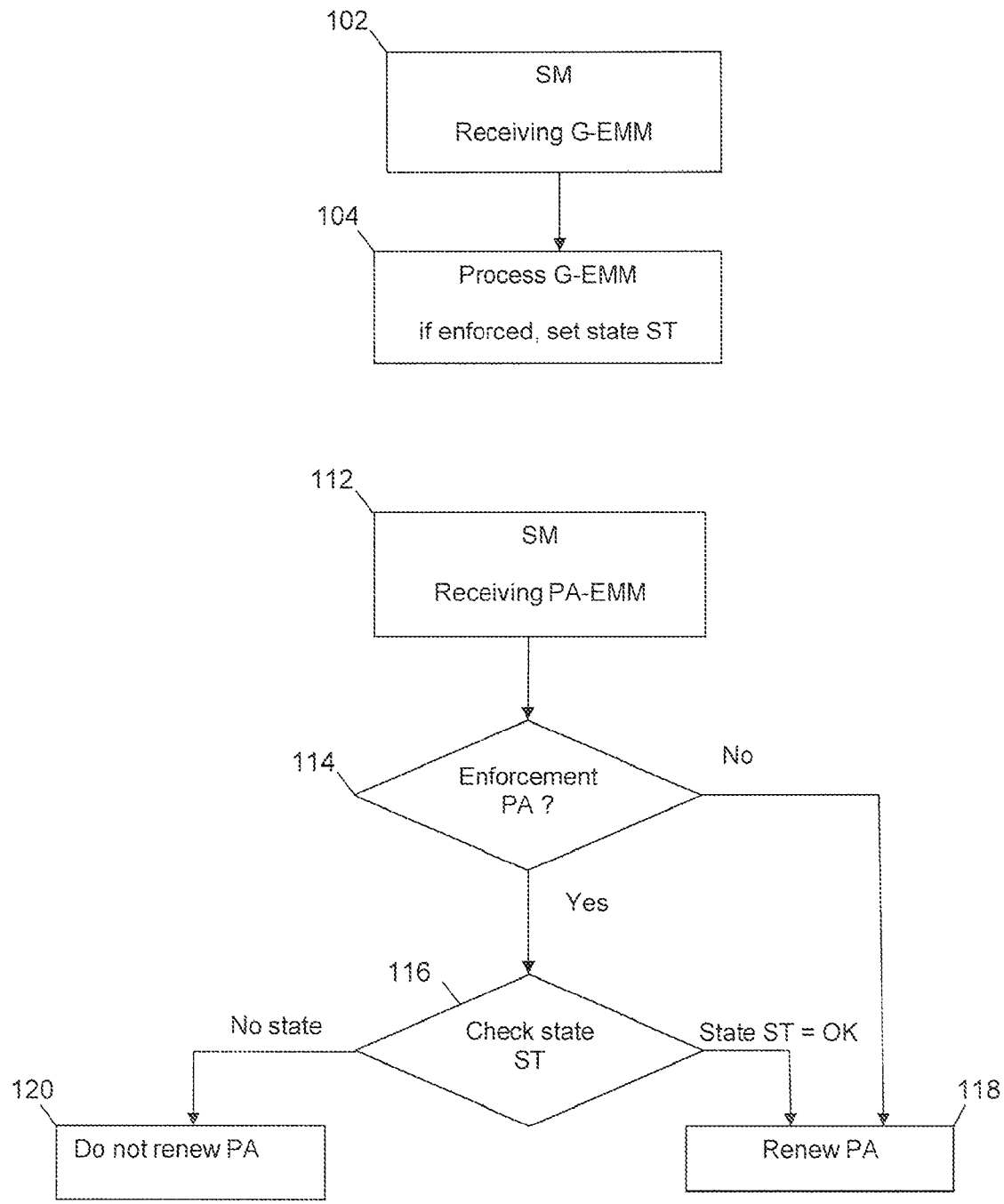
FIG. 1 shows a block diagram including steps performed by the security module to enforce processing of management messages according to a method of one embodiment.

The block diagram of FIG. 1 illustrates a method wherein a security module SM associated to a multimedia receiver MR receives global management messages G-EMMs at step 102, and positive addressing management messages PA-EMMs at step 112 of FIG. 1. The global EMMs G-EMM are enforced by processing the PA EMMs only if conditions set by the G-EMMs are fulfilled. According to a preferred configuration, the processing of the global management messages G-EMMs sets up a state ST of the security module SM defining a successful ST=OK at step 104, or an unsuccessful processing of the G-EMMs letting no trace i.e. no state, or a partial trace showing only part of the G-EMMs where processed.

In the case of a enforcement PA-EMM at step 114, if the state ST=OK at step 116, the positive addressing management messages PA-EMMs are processed to renew in the security module SM specific parameters related to access rights, at step 118. The services purchased by the user are therefore fully accessible according to the stored rights specific to the security module SM.

When the processing of the G-EMMs lets no trace or provides no effect at step 116, the access to the broadcast services subjected to the PA is either denied or restricted as dictated by the PA policy, at step 120. Two solutions may be possible to re-establish the access:

1) redo the regular process by waiting the next global and positive addressing messages G-EMM, PA-EMM or 2) settle and/or update subscription at the managing center MC which will address the necessary EMMs to the multimedia receivers MR for renewing the access rights in the security module SM.

According to an embodiment, the parameters previously set by the G-EMMs are compared with the parameters carried by the PA-EMMs. A positive result of the comparison indicates that the G-EMMs have been successfully enforced. A negative result of the comparison will have the same consequences than a trace absence of the preceding embodiment.

Besides access rights, the EMMs may also comprise parameters such as those related to an anti-splitter module configured to detect the distribution of control words to other receivers. In fact, one possible way to enjoy access to service encrypted data without being authorized consists in using a genuine multimedia receiver with a real security module, but distributing the control words to a set of multimedia receivers. This can be done by means of a server or separating device known as a "splitter". Therefore, the amounts related to the acquisition of access rights to encrypted data are paid by a single multimedia receiver while the services are accessible from several multimedia receivers.

Data related to an update of the security module software from a current version to a new version or other security operating data of the security module may also be comprised in the parameters.

When some condition that is currently accessible has to be enforced by the conditional PA-EMM mechanism (G-EMMs and PA-EMMs), such as data segments in the memory of the security module or its software version, the method of the invention becomes advantageous. For example when a software update patch that brings the security module to a given higher version has to be enforced, it will be sufficient to condition the EMMs to this higher version or to a higher one.

An additional advantage of using the PA-EMM mechanism is that a grace period principle is introduced by using PA-EMMs, i.e. the fact that the date in the PA-EMM is relatively far in the future even though the PA-EMMs renewal frequency is shorter: for example, if the PA-EMMs are renewed every 20 days, the date itself is pushed 2 months in the future, so that when a user comes back from a 4 weeks holiday during which the multimedia receiver was switched off, the dates set by the PA-EMMs previously received are still valid at switching on the multimedia receiver and he will receive the enforced G-EMMs and the new PA-EMMs before expiration of the date.

In order to prevent filtering the global management messages G-EMMs which successful processing let a trace or a state (ST) allowing PA-EMMs processing, the state (ST) may be reset after the PA-EMMs have been processed. In this case, the next G-EMMs successful processing will renew the state (ST) necessary for the PA-EMMs processing and so on. When several PA-EMMs are transmitted in a sequence for example, only the last PA-EMM will reset the state (ST).

Another way to reset the trace or the state (ST) is to limit its life time by setting a predefined time period after which the state (ST) is reset, either by a parameter in the G-EMMs or by a timer set up in the security module upon reception of the G-EMMs.

The time period depends on the periodicity of the PA-EMMs. Its duration is defined so that the state (ST) remains at least until reception of the positive addressing management message (PA-EMM).

In a preferred application of the method of the invention, the PA-EMM sent at the initialization of a new security module would not be conditioned, so that there is no impact on a new subscriber. However, the subscriber will still have to get the global G-EMMs enforced before the end of PA-EMMs reception or his PA-EMMs will not be prolonged. The subscriber gets one PA period to acquire the enforced EMMs. A new security module SM is thus configured in such a way that it possesses an initial state ST0=OK corresponding to the state ST=OK reached by a successful execution of global management messages G-EMM in a security module in service. This state ST0=OK will allow a successful enforcement of a PA-EMM transmitted by the management center MC.

According to a further application example, the PA-EMMs can be used to extend the service authorization period for paid services stored on a security module of a subscriber. This can be accomplished by pushing the expiration date forward in time by generating PA-EMMs for each service and sending them to the concerned multimedia unit by individual addressing or group addressing.

Figure 2:
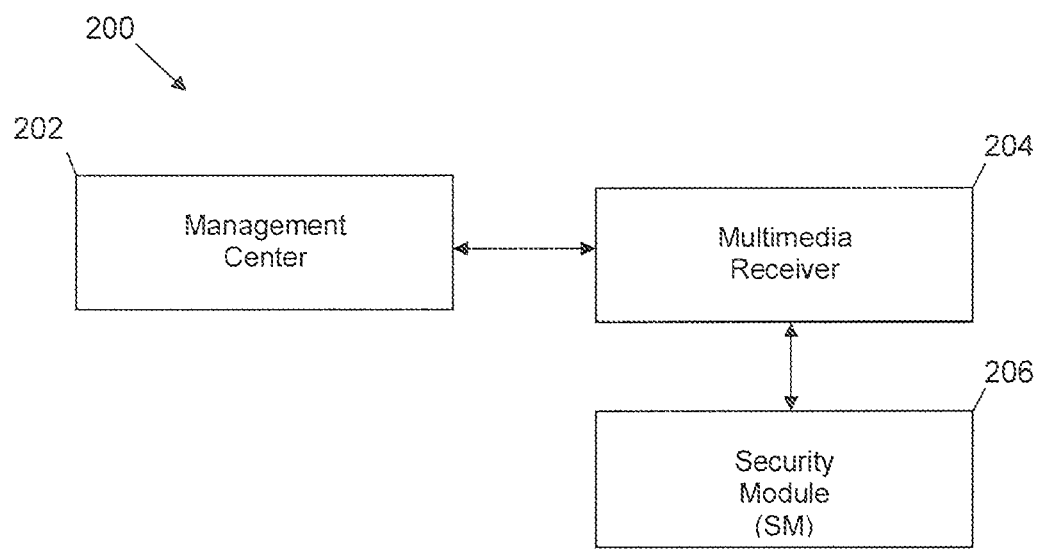
FIG. 2 shows a block diagram of a pay television system according to one embodiment.

FIG. 2 shows a block diagram of an embodiment of a pay television system 200. In the system of FIG. 2, a management center 202 is in communication with a multimedia receiver 204. Such communication may be wired (e.g., a cable), satellite, terrestrial broadcast, the Internet, or any other means, and may be one way or two way. The multimedia receiver 204 may take the form of a set top box or other receiver as is known in the art. The security module 206 may be implemented in a variety of manners such as on a microprocessor card, on a smartcard or any electronic module in the form of a badge or key. These modules are generally portable and detachable from the host user unit and are designed to be tamper-proof. The most commonly used form has electrical contacts, but contactless versions of type ISO 14443 also exist. Another implementation of the security module 206 may consist either of a directly soldered integrated circuit inside the user unit or a circuit on a socket or connector such as a SIM (Subscriber Identity Module) module. The security module 206 may also be integrated on a chip which has another function e.g. on a descrambling module or on a microprocessor module of a pay television set top box. The security module 206 may also be implemented as a software device managed by a processor of the user unit. The security module 206, in addition to a processor, may also have a memory and a port or channel through which communication with the multimedia receiver can be conducted. It should be understood that the invention is not limited to pay television systems, but rather may be used in any system which conditional access to content is desired.

The invention claimed is:

1. A method to enforce processing of management messages by a security module associated to a multimedia receiver configured to receive access controlled multimedia services, the management messages received from a managing center by the multimedia receiver being processed by the security module, the method comprising steps of:
   receiving, by the security module, at least one global management message addressed to all multimedia receivers associated with the managing center;
   tracing, by the security module, the processing of said at least one global management message by setting a state in memory of the security module, the state defining a successful process while an unsuccessful or a partial processing of the global management message results in an absence of the state;
   receiving, by the security module, at least one positive addressing management message specifically addressed to a predefined group that includes said security module but does not include all multimedia receivers associated with the managing center, the at least one positive addressing management message comprising an identifier of the security module associated with commands and parameters for setting up in said security module access rights to multimedia services; and
   processing the positive addressing management message only if the state set during tracing of the processing of the at least one global management message indicates a successful processing of the at least one global management message, thereby allowing the multimedia receiver access to multimedia services, wherein the state is reset only after processing a last positive addressing management message in a sequence of positive addressing management messages, said state being renewed after successful processing of a next global management message.

2. The method according to claim 1, wherein the absence of the state indicating an unsuccessful enforcement of the global management message results in denial of access to the access controlled multimedia services or in an access restricted to global access rights and parameters.

3. The method according to claim 1, wherein a new security module is configured in such a way that an initial state of said new security module corresponds to the state reached by a successful execution of at least one global management message, said initial state allowing a successful enforcement of a positive addressing management message transmitted by the management center.

4. The method according to claim 1, wherein the security module of the multimedia receiver receives a sequence of management messages comprising at least two global management messages and at least one positive addressing management message following the global management messages.

5. The method according to claim 4, wherein the positive addressing management message is processed by the security module only if all the global management messages of the sequence are enforced successfully.

6. The method of claim 1, wherein the at least one global management message comprises data related to an update of the security module software.

7. A security module configured to enforce processing of management messages, the security module being associated to a multimedia receiver configured to receive access controlled multimedia services and the management messages from a managing center, the security module comprising:
  a processor; and
  a memory connected to the processor;
  wherein the security module is further configured to
    receive at least one global management message addressed to all multimedia receivers associated with the managing center;
    trace the processing of said at least one global management message by setting a state in the memory, the state defining a successful processing while an unsuccessful or a partial processing of the global management message results in an absence of the state;
    receive at least one positive addressing management message specifically addressed to a predefined group that includes said security module but does not include all multimedia receivers associated with the managing center, the at least one positive addressing management message comprising an identifier of the security module associated with commands and parameters for setting up in said security module access rights to multimedia services; and
    process the positive addressing management message only if the state set during tracing of the processing of the at least one global management message indicates a successful processing of the at least one global management message, thereby allowing the multimedia receiver access to multimedia services wherein the state is reset only after processing a last positive addressing management message in a sequence of positive addressing management messages, said state being renewed after successful processing of a next global management message.

8. The security module according to claim 7, wherein the absence of the state indicating an unsuccessful enforcement of the global management message results in denial of access to the access controlled multimedia services or in an access restricted to global access rights and parameters.

9. The security module according to claim 7, wherein, during an initialization phase of the security module, an initial state is set up, said initial state corresponding to the state reached by a successful execution of at least one global management message, said initial state allowing a successful enforcement of a positive addressing management message transmitted by the management center.

10. The security module according to claim 7, further configured to receive a sequence of management messages comprising at least two global management messages and at least one positive addressing management message following the global management messages.

11. The security module according to claim 10, further configured to process the positive addressing management message only if all the global management messages of the sequence are enforced successfully.

12. The security module according to claim 7, wherein the at least one global management message comprises data related to an update of the security module software.

* * * * *